Oct. 20, 1959 C. J. KUCYN 2,909,641
TOOL FOR ELECTRO-SHAPING
Filed May 2, 1958 3 Sheets-Sheet 1
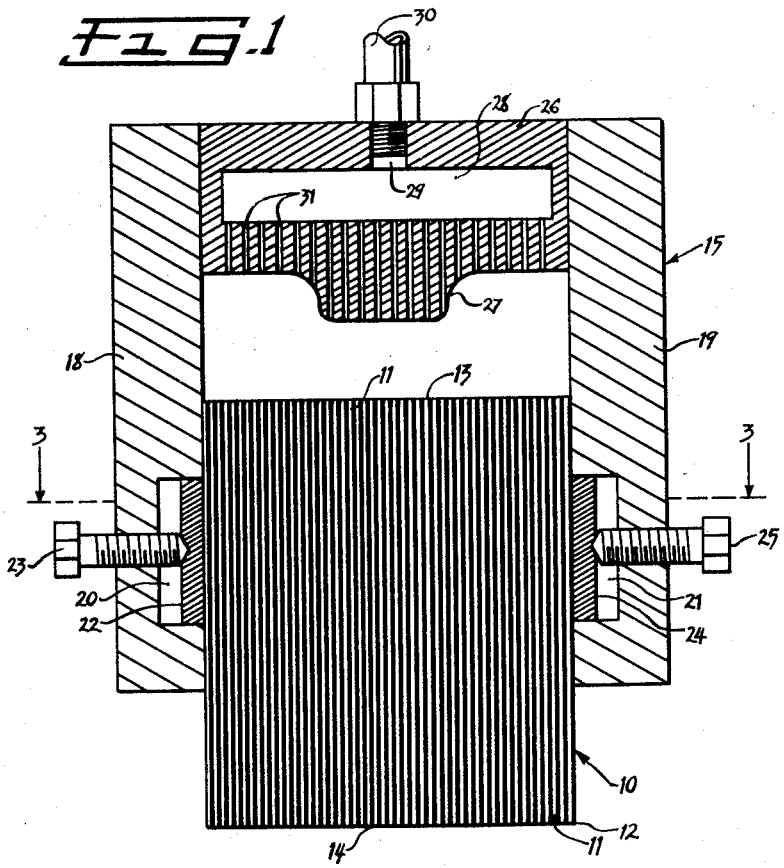
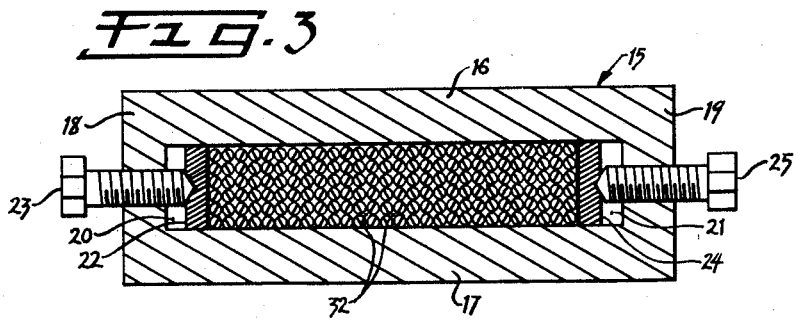
INVENTOR.
CHESTER J. KUCYN
BY
Franz O. Ohlson, Jr.
ATTORNEY

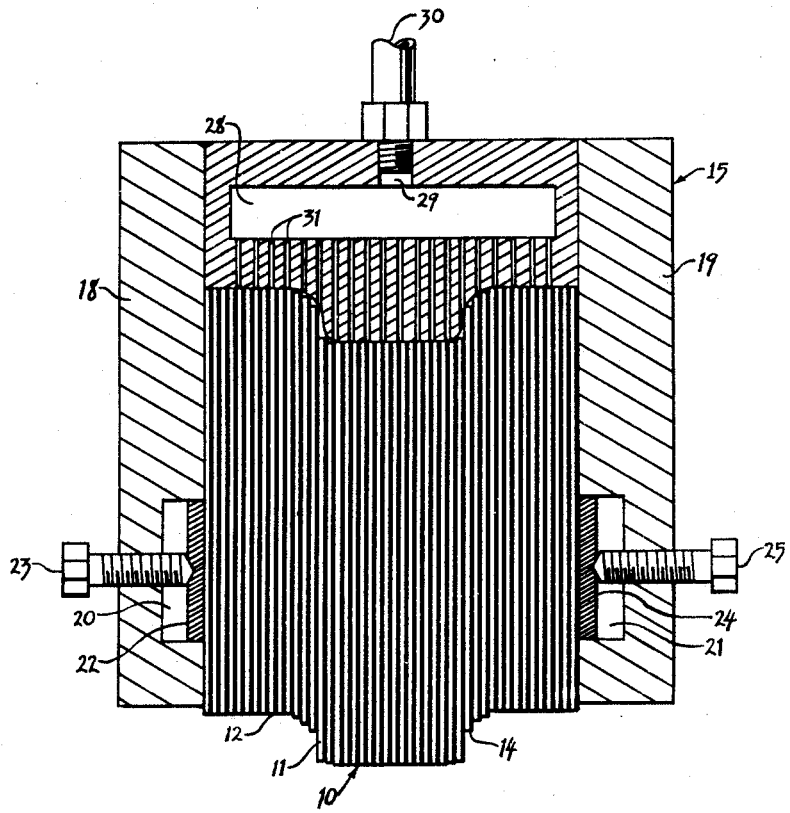

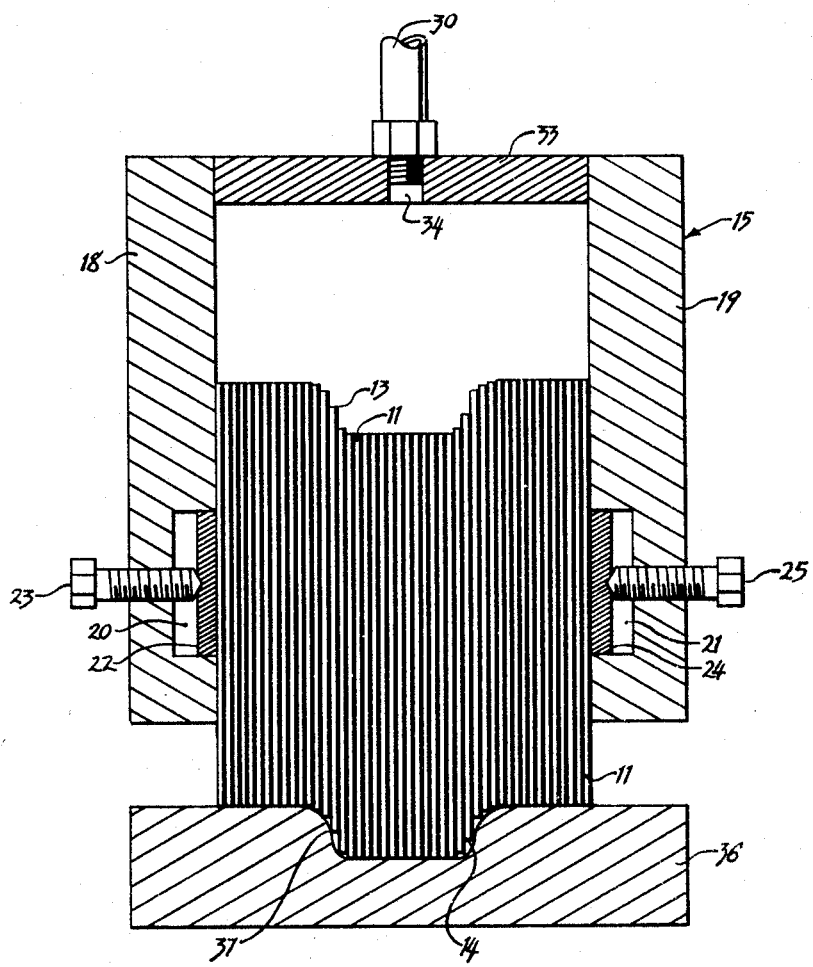

United States Patent Office 2,909,641
Patented Oct. 20, 1959

2,909,641

TOOL FOR ELECTRO-SHAPING

Chester J. Kucyn, Huntington, N.Y., assignor to Republic Aviation Corporation, Farmingdale, N.Y., a corporation of Delaware Application May 2, 1958, Serial No. 732,713

12 Claims. (Cl. 219—69)

This invention relates in general to tools and more particularly to tools for use in the electro-shaping or electrical discharge machining of metallic workpieces.

In electro-shaping or electrical discharge machining, the tool is provided with a contoured working face to which a surface of the workpiece is to be conformed. The tool and workpiece are associated with an electrical circuit, including a power source, whereby when the working face of the tool and the selected surface of the workpiece are brought into a predetermined spaced relationship, a series of electrical sparks are discharged between the working face of the tool and the adjacent surface of the workpiece. These electrical sparks remove or erode the metal of the workpiece thereby machining or shaping the surface thereof into conformance with the working face of the tool.

To prevent the overheating of either the tool or the workpiece and to carry away the metal removed therefrom, a dielectric fluid is circulated between and around the working face of the tool and the adjacent surface of the workpiece.

One of the problems posed in this type of metal working, is that although the electrical sparks or discharges remove the metal of the workpiece, they also remove portions of the tool so that the contour of its working face is destroyed or seriously impaired. As a result, the tool must be replaced frequently during the shaping or machining of a workpiece.

It is apparent, therefore, that where the working face of the tool comprises a complex surface, the tool is expensive to make, since a substantial amount of machining and hand-finishing is required, and yet it has a relatively short working life. Moreover, while tools made of certain metals, such as tungsten and the like, are capable of relatively long use, such tools are also extremely difficut to make and such materials are relatively expensive.

Another problem, posed in electro-shaping operations, is to provide for an adequate flow of the dielectric fluid between the working face of the tool and the adjacent surface of the workpiece to the end that overheating of the tool and workpiece is prevented and the metal removed is effectively carried away.

Among other objects, the present invention contemplates an electro-shaping tool so constructed and arranged that a working face may be readily established and re-established thereon.

A further object of the instant invention is to provide an electro-shaping tool embodying means for circulating a dielectric fluid through the tool and its working face.

With the above and other objects in view as will become apparent, the present invention consists in the combination and arrangement of parts all as hereinafter more fully described, claimed and illustrated in the accompanying drawings, wherein:

Fig. 1 is a vertical section through one embodiment of the electro-shaping tool contemplated herein prior to establishing a working face thereon;

Fig. 2 is a section similar to Fig. 1 but after the working face for the tool has been established;

Fig. 3 is a section taken along line 3—3 of Fig. 1; and

Fig. 4 is a second embodiment of the electro-shaping tool contemplated herein and the means whereby a working face may be established thereon.

Referring now to the drawings, in particular Fig. 1, 10 designates the body of the tool contemplated herein, which comprises a plurality of pins 11 positioned or stacked in side-by-side relationship. The pins 11 are each of the exact same length and the opposite ends thereof are ground or otherwise finished to provide smooth end surfaces 12 and 13 that lie in a plane normal to the length or longitudinal axis of the pin.

As will hereinafter be more fully set forth, the end surfaces 12 of the pins 11 combine to establish or form a working face 14 for the tool body 10. Thus, as shown in Fig. 1, the end surfaces 12 of the pins 11 are coplanar and hence the working face 14 formed thereby comprises a substantially flat plane. However, by adjusting the pins 11 relatively, one to the other, i.e., displacing the end surfaces 12 out of the same plane, the working face 14 formed by their end surfaces 12 may be of any selected contour or configuration.

To provide means whereby the pins 11 may be secured or clamped together in any adjusted relationship, they are inserted within one end of a hollow holder 15 in such a manner that their end surfaces 12 are disposed outwardly of one end thereof, while the end surfaces 13 are disposed within its interior. In this instance, the holder 15 comprises a rectangular, box-like frame consisting of longitudinal side walls 16 and 17 and transverse side walls 18 and 19. Adjacent the end of the holder 15 through which the pins 11 are inserted, the transverse side walls 18 and 19 are provided with inwardly extending grooves 20 and 21, respectively, that are aligned in parallel relationship one with the other and extend between the side walls 16 and 17. The groove 20 has slidably mounted therein a clamping plate 22, one side of which is adapted to engage the sides of the pins 11 adjacent thereto, while the opposite side thereof is adapted for engagement with a bolt 23 that is threadedly mounted through the transverse side wall 18. Rotation of the bolt 23 in one direction moves the plate toward and into engagement with the adjacent sides of the pins 11. The groove 21 is provided in a similar manner with a clamping plate 24 and a bolt 25 threadedly mounted in and through the transverse side wall 19 engages the clamping plate 24 and cooperates therewith to the end that it may be moved toward and into engagement with the sides of the pins 11 adjacent thereto. Due to the foregoing construction and arrangement the bolts 24 and 25 may be rotated to move the clamping plates 22 and 24 toward each other whereby the pins 11 are clamped therebetween in any selected adjusted position.

As above set forth, the pins 11 are inserted through and extend partially from one end of the holder 15. The opposite end of the holder 15 is adapted to receive a die 26, having a contoured surface 27 for producing a selected or predetermined contour on a surface of the workpiece. As shown in Figs. 1 and 2, the contoured surface 27 is a mirror image of the contoured surface to be formed on the workpiece. The die 26 is positioned within the end of the holder 15 with its contoured surface 27 disposed within its interior and facing the end surfaces 13 of the pins 11. Any conventional means, not shown, may be used to secure the die 26 in its position as aforesaid.

Due to the foregoing construction and arrangement of parts, when the pins 11 are inserted in the holder 15, they are moved inwardly thereof until their end surfaces 13 abut or engage the contoured surface 27 of the die 26. As shown more particularly in Fig. 2, when the pins 11 are so disposed, the working surface 14 formed by their end surfaces 12 is substantially a duplicate of the contoured surface 27 of the die 26. Stated differently, the contoured surface 27 of the die 26 is transferred by the pins 11 so that their end surfaces 12 form a working face 14 for the tool body 10 having the same contour as the surface 27 of the die 26.

The end surfaces 12 and 13 of the pins 11 are flat surfaces. Therefore, the contoured working face 14 formed thereby does not conform exactly to the contoured surface 27 of the die 26, but, as shown in Fig. 2, comprises a plurality of steps. However, this stepped construction of the working face 14 is a function of the diameter of the pins 11, so that by using pins 11 of relatively small diameter, the contoured working face 14 conforms more nearly to the contoured surface 27 of the die 26.

To provide means whereby the dielectric fluid normally used in electro-shaping may be supplied through the face 14 of the tool body 10 and between it and the adjacent surface of the workpiece being formed thereby, the die 26 is provided with an internal chamber 28 having an inlet 29 that is adapted for connection, as for example by a coupling 30, to a pressurized source of dielectric fluid. A plurality of small-diameter passageways 31 extend from the chamber 28 through the body of the die 26 and the contoured surface 27 thereof. Thus, when the dielectric fluid under pressure is supplied to the chamber 28 it will pass through these passageways 31 and the contoured surface 27 of the die 26.

As shown more particularly in Fig. 3 when the pins 11 are clamped in their adjusted position between the plates 22 and 24, a plurality of spaces 32 are produced between the adjacent sides of the pins 11. These spaces 32 extend along the entire length of the pins 11 between their end surfaces 12 and 13. Therefore, the dielectric fluid that passes through the passageways 31 is distributed between the contoured surface 27 of the die 26 and the end surfaces 13 of the pins 11 to the end that it will also pass through the spaces 32 to and through the working face 14 of the tool body 10. Hence, the dielectric fluid flows through the tool body 10 and is made available between its working face 14 and the adjacent surface of the workpiece being electro-shaped thereby.

In Fig. 4, the holder 15 is modified to the end that in lieu of the die 26, the end of the holder 15 is closed by an end plate 33 having an inlet 34 adapted for connection with the coupling 30. Thus, in this instance, the space between the inner surface of the end plate 33 and the surfaces 13 of the pins 11 serves as a chamber into which the dielectric fluid is supplied through the coupling 30.

In this form of the tool holder 15, the working face 14 of the tool body 10 is established by means of a die 36 having a contoured surface 37 that is an exact duplicate of the surface to be formed on the workpiece. Thus, as opposed to the form of the tool holder 15 shown in Figs. 1 and 2, where the die 26 is mounted within the tool holder and the contoured surface 27 is a mirror image of the surface to be formed on the workpiece, in this instance, the contoured surface 37 of the die 36 is exactly the same as the contoured surface to be formed on the workpiece.

To establish the working face 14, the pressure, if any, imposed on the pins 11 by the clamping plates 22 and 24 is relieved by the suitable rotation of the bolts 23 and 25 to the end that the pins 11 are freely slidable within the holder 15. The holder 15 is then disposed over the die 36, as shown in Fig. 4, so that the pins 11 may drop into engagement with the contoured surface 37 of the die 36 and assume the desired adjusted position whereby the working face 14 is established. The bolts 23 and 25 are then rotated to clamp the pins 11 between them thereby holding the pins 11 in their adjusted position.

The working face 14 thus established on the tool body 10 is exactly the same as that shown in Fig. 2 and, as set forth more fully above, does not conform exactly to the contour 37 of the die 36 but rather comprises a plurality of relatively small steps each formed by an end surface 12 of a pin 11. However, by selecting pins 11 of relatively small diameter, the working face 14 will conform substantially to the contoured surface 37 of the die 36.

As heretofore set forth during the electro-shaping of the workpiece by the tool body 10, the working face 14 thereof will be impaired due to the fact that the machining spark not only removes portions of the workpiece, but also of the pins 11. When the working face 14 has been impaired to the extent that it is no longer satisfactory for producing the desired contour on the workpiece, the working face 14 may be readily re-established. More particularly, in the instance where the embodiment shown in Figs. 1 and 2 is used, the pins 11 are removed from the holder 15 and ground or otherwise finished to provide smooth end surfaces 12. Thus, the pins 11 are once more restored to equal length with flat end surfaces 12 and 13, respectively, that lie normal to the length of the pin. The working face 14 may then be reestablished on the tool body 10 in the manner heretofore set forth. In brief, the pins 11 are moved inwardly of the holder 15 until the end surfaces 13 thereof abut or engage the contoured surface 27 of the die 26. On the other hand, if the holder 15 is used as shown in Fig. 4, the pins 11 merely are re-positioned on the contoured surface 37 of the die 36 to thereby establish the working face 14.

It is manifest from the foregoing, that the various objects of the instant invention heretofore set forth have been achieved and that modifications may be made of the parts and arrangements hereinbefore described without departing from the scope thereof.

What is claimed is:

1. An electro-shaping tool comprising a body formed of a plurality of pins each having a flat end surface, said pins being arranged in side-by-side relationship whereby said end surfaces combine to establish a selected contoured working face for said body, and means for holding said pins in their arranged position.

2. An electro-shaping tool comprising a body formed of a plurality of cylindrical pins each having a flat end surface and stacked in side-by-side relationship, said pins being of equal length and adjustable relative to each other whereby the flat end surfaces thereof combine to establish a selected contoured working face for said body, and means for securing said pins in their stacked position.

3. An electro-shaping tool comprising a tool body formed of a plurality of pins each having a flat end surface, said pins being arranged in side-by-side relationship and adjustable relative to each other whereby said end surfaces combine to form a selected contoured working face for said body, means for adjusting said pins relatively to each other to establish a selected contour on the working face formed by said end surfaces, and means for holding said pins in their adjusted position.

4. An electro-shaping tool comprising a tool body formed of a plurality of pins each of equal length and having a flat end surface, said pins being arranged in side-by-side relationship and adjustable with respect to each other whereby the flat end surfaces thereof may be disposed relative to each other to establish a selected contoured working face for said body, means for holding said pins in their adjusted position, and means for circulating a fluid along the sides of and between said pins and through said working face.

5. An electro-shaping tool comprising a tool body formed of a plurality of pins each having a flat end surface, said pins being arranged in side-by-side relationship and adjustable relative to each other whereby said flat end surfaces combine to form a working face for said body, die means for adjusting said pins relative to each other to establish a selected contour on the working face formed by said flat end surfaces, and means for clamping said pins in the adjusted position thereof.

6. An electro-shaping tool comprising a tool body formed of a plurality of pins each of equal length and having opposed flat end surfaces, said pins being arranged in side-by-side relationship and adjustable relative to each other, die means engageable with the flat surfaces of one end of said pins for adjusting said pins relative to each other whereby the flat surfaces at the other end of said pins combine to establish a selected working face for said tool body, and means for holding said pins in the adjusted position thereof.

7. An electro-shaping tool comprising a hollow holder, a plurality of pins each of equal length and having flat surfaces at the opposite ends thereof, said pins being mounted in one end of said holder in side-by-side relationship and with the flat surfaces at one end thereof extending outwardly of said holder, a die having a contoured surface mounted in said holder, said pins being adjustable within said holder whereby the flat surfaces at the opposite end thereof may be positioned in engagement with the contoured surface of said die whereby the flat surfaces at the ends of said pins extending outwardly of said holder combine to form a working face for said tool, and means for holding said pins in their adjusted position.

8. An electro-shaping tool comprising a hollow holder, a plurality of pins each of equal length and having flat end surfaces at the opposite ends thereof, said pins being mounted in one end of said holder in side-by-side relationship and with the flat surfaces at one end thereof extending outwardly of said holder, a contoured die mounted in said holder, said pins being movable within said holder whereby the flat surfaces of said pins disposed within said holder may be positioned against the contour of said die to thereby transfer the contour of said die to the outwardly disposed flat surfaces of said pins whereby a working face is established for said tool, means for holding said pins in their adjusted position, a chamber in said die, and means communicating said chamber with the ends of the pins positioned against the contour of said die.

9. An electro-shaping tool comprising a hollow holder, a plurality of pins each of equal length and having flat surfaces at the opposite ends thereof, said pins being mounted through one end of said holder in side-by-side relationship and with the flat surfaces at one end thereof extending outwardly of said holder and the flat surfaces at the opposite end thereof disposed within said holder, a die having a contoured surface mounted in the other end of said holder with its contoured surface facing the flat surfaces of said pins disposed within said holder, said pins being adjustable within said holder whereby the adjacent flat surfaces of said pins may be positioned in contact with the contoured surface of said die whereby the contoured surface of said die is transferred to the outwardly disposed flat surfaces of said pins to thereby establish a contoured working face for said tool, and releasable clamping means carried by said holder and engageable with said pins for securing said pins in their adjusted position.

10. An electro-shaping tool comprising a hollow holder, a plurality of pins each of equal length and having flat surfaces at the opposite ends thereof, said pins being mounted in one end of said holder in side-by-side relationship and with the flat surfaces at one end thereof extending outwardly of said holder, a die having a contoured surface mounted in said holder, said pins being adjustable within said holder whereby the flat surface at the opposite end thereof may be positioned in engagement with the contoured surface of said die whereby the flat surfaces at the ends of said pins extending outwardly of said holder combine to form a working face for said tool, means for holding said pins in their adjusted position, and means for circulating a fluid through the working face of said tool.

11. An electro-shaping tool comprising a hollow holder, a plurality of pins each of equal length and having flat end surfaces at the opposite ends thereof, said pins being mounted in one end of said holder in side-by-side relationship and with the flat surfaces at one end thereof extending outwardly of said holder, a contoured die mounted in said holder, said pins being movable within said holder whereby the flat surfaces of said pins disposed within said holder may be positioned against the contour of said die to thereby transfer the contour of said die to the outwardly disposed flat surfaces of said pins whereby a working face is established for said tool, means for holding said pins in their adjusted position, a chamber in said die, means for communicating said chamber with a source of fluid under pressure, and means communicating said chamber with the ends of the pins positioned against the contour of said die whereby the fluid in said chamber is delivered through the working face of said tool.

12. An electro-shaping tool comprising a hollow holder, a plurality of pins each of equal length and having flat surfaces at the opposite ends thereof, said pins being mounted through one end of said holder in side-by-side relationship and with the flat surfaces at one end thereof extending outwardly of said holder and the flat surfaces at the opposite end thereof disposed within said holder, a die having a contoured surface mounted in the other end of said holder with its contoured surface facing the flat surfaces of said pins disposed within said holder, said pins being adjustable within said holder whereby the adjacent flat surfaces of said pins may be positioned in contact with the contoured surface of said die, whereby the contoured surface of said die is transferred to the outwardly disposed flat surfaces of said pins to thereby establish a contoured working face for said tool, releasable clamping means carried by said holder and engageable with said pins for securing said pins in their adjusted position, and means for circulating a fluid through said working face of said tool.

References Cited in the file of this patent
UNITED STATES PATENTS

| | | |
|---|---|---|
| 1,778,628 | Eckman | Oct. 14, 1930 |
| 2,449,917 | Tansley | Sept. 21, 1948 |
| 2,826,676 | Fullerton et al. | Mar. 11, 1958 |